(12) United States Patent
Kim et al.

(10) Patent No.: US 10,893,348 B2
(45) Date of Patent: Jan. 12, 2021

(54) SOUND VIBRATION ACTUATOR

(71) Applicant: Mplus CO., LTD., Suwon-si (KR)

(72) Inventors: Yong Tae Kim, Suwon-si (KR); Yeon Ho Son, Suwon-si (KR); Dong Su Moon, Suwon-si (KR)

(73) Assignee: MPLUS CO., LTD., Suwon-si (KR)

(*) Notice: Subject to any disclaimer, the term of this patent is extended or adjusted under 35 U.S.C. 154(b) by 0 days.

(21) Appl. No.: 16/508,352

(22) Filed: Jul. 11, 2019

(65) Prior Publication Data
US 2020/0076935 A1 Mar. 5, 2020

(30) Foreign Application Priority Data

Aug. 31, 2018 (KR) .................. 10-2018-0103372

(51) Int. Cl.
| | |
|---|---|
| H04R 1/06 | (2006.01) |
| H04M 1/03 | (2006.01) |
| H04M 19/04 | (2006.01) |
| H04R 9/06 | (2006.01) |
| H04R 11/02 | (2006.01) |

(Continued)

(52) U.S. Cl.
CPC .............. *H04R 1/06* (2013.01); *H04M 1/035* (2013.01); *H04M 19/047* (2013.01); *H04R 1/02* (2013.01); *H04R 9/06* (2013.01); *H04R 9/066* (2013.01); *H04R 11/02* (2013.01); H04M 1/026 (2013.01); H04M 1/03 (2013.01); H04R 1/021 (2013.01); H04R 7/04 (2013.01); H04R 9/025 (2013.01); H04R 2400/03 (2013.01); H04R 2400/07 (2013.01)

(58) Field of Classification Search
CPC ...... H04M 1/03; H04M 1/035; H04M 19/047; H04R 1/02; H04R 1/021; H04R 1/06; H04R 7/04; H04R 9/025; H04R 9/06; H04R 9/066; H04R 11/02; H04R 2400/03; H04R 2400/07
USPC ........ 381/152, 162, 400, 403, 412, 418, 431
See application file for complete search history.

(56) References Cited

U.S. PATENT DOCUMENTS

| | | | | |
|---|---|---|---|---|
| 5,528,697 | A * | 6/1996 | Saito | ........................ B06B 1/045 |
| | | | | 340/407.1 |
| 8,941,272 | B2 * | 1/2015 | Hong | ..................... H02K 33/18 |
| | | | | 310/15 |

(Continued)

FOREIGN PATENT DOCUMENTS

| | | |
|---|---|---|
| KR | 10-2002-0024186 A | 3/2002 |
| KR | 20-0332992 Y1 | 11/2003 |

(Continued)

*Primary Examiner* — Jesse A Elbin
(74) *Attorney, Agent, or Firm* — LRK Patent Law Firm

(57) ABSTRACT

A sound vibration actuator includes: a bracket and a casing for forming an internal space; a coil part coupled to the bracket in the internal space; a magnet part disposed around the coil part; an elastic member whose one surface coupled to the magnet part; a substrate fixed to the bracket and exposed outward from the internal space; and a substrate seating part disposed on the outer peripheral surface of the casing, wherein the substrate is disposed on top of the substrate seating part. The sound vibration actuator reduces the entire thickness thereof, while constantly maintaining an amount of vibration and generate vibrations in various frequency bands because the coil and the magnet are not fixed in the process where the vibrations are generated.

6 Claims, 6 Drawing Sheets

(51) Int. Cl.
    *H04R 1/02*     (2006.01)
    *H04M 1/02*     (2006.01)
    *H04R 7/04*     (2006.01)
    *H04R 9/02*     (2006.01)

(56) References Cited

U.S. PATENT DOCUMENTS

| | | | | |
|---|---|---|---|---|
| 2005/0180593 | A1* | 8/2005 | Kajiwara | H04R 9/06 381/412 |
| 2008/0306332 | A1* | 12/2008 | Choi | H02K 33/16 600/38 |
| 2011/0309692 | A1* | 12/2011 | Park | H02K 33/16 310/25 |
| 2012/0169153 | A1* | 7/2012 | Ueda | H02K 33/16 310/25 |

FOREIGN PATENT DOCUMENTS

| | | |
|---|---|---|
| KR | 10-2005-0106446 A | 11/2005 |
| KR | 10-2007-0031512 A | 3/2007 |
| KR | 10-2010-0019822 A | 2/2010 |
| WO | 2015/064340 A1 | 5/2015 |

\* cited by examiner (a) (b)

(c) (d)

SOUND VIBRATION ACTUATOR

CROSS REFERENCE TO RELATED APPLICATION

The present application claims the benefit of Korean Patent Application No. 10-2018-0103372, filed in the Korean Intellectual Property Office on Aug. 31, 2018, the entire content of which is incorporated herein by reference.

BACKGROUND OF THE INVENTION

1. Field of the Invention

The present invention relates to a sound vibration actuator, and more particularly, to a sound vibration actuator whose entire height is reduced so that it can become compactualized.

2. Description of Related Art

Generally, mobile terminals like smartphones have vibration functions (haptic functions) of interfacing call forwarding as well as of interfacing key input, event occurrence, and application execution to a user.)

A vibration motor, which is used as a driving device having such a vibration function, converts an electromagnetic force into a mechanical driving force to generate up and down vibrations, and with the trend toward the compactualization of a mobile terminal, a sound vibration actuator capable of generating sounds as well as vibrations has been developed.

Meanwhile, the sound vibration actuator needs a thin input terminal exposed outward therefrom to supply an electric current to a coil, and accordingly, the sound vibration actuator has to have a casing or substrate support capable of stably fixing the thin input terminal thereto. If the substrate support is separately disposed on the underside of the sound vibration actuator, however, the whole thickness of the sound vibration actuator becomes undesirably increased.

SUMMARY OF THE INVENTION

Accordingly, the present invention has been made in view of the above-mentioned problems occurring in the related art, and it is an object of the present invention to provide a sound vibration actuator whose entire thickness is reduced so that it can become compactualized.

It is another object of the present invention to provide a sound vibration actuator that is capable of stably fixing a substrate exposed outward therefrom.

The technical problems to be achieved through the present invention are not limited as mentioned above, and other technical problems not mentioned herein will be obviously understood by one of ordinary skill in the art through the following description.

To accomplish the above-mentioned objects, according to the present invention, there is provided a sound vibration actuator including: a bracket and a casing for forming an internal space; a coil part coupled to the bracket in the internal space; a magnet part disposed around the coil part; an elastic member whose one surface coupled to the magnet part; a substrate fixed to the bracket and exposed outward from the internal space; and a substrate seating part disposed on the outer peripheral surface of the casing, wherein the substrate is disposed on top of the substrate seating part.

According to the present invention, desirably, the substrate seating part includes: a first area disposed on the outer peripheral surface of the casing; and a second area extended from the first area in such a manner as to seat the substrate thereon.

According to the present invention, desirably, the underside of the second area of the substrate seating part is located on the same plane as the underside not open of the casing.

According to the present invention, desirably, the first area of the substrate seating part comes into contact with the outer peripheral surface of the casing.

According to the present invention, desirably, the other surface of the elastic member, which is not coupled to the magnet part, is fixed to the casing or the bracket.

According to the present invention, desirably, the substrate seating part comes into close contact with the outer peripheral surface of the casing by means of welding.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
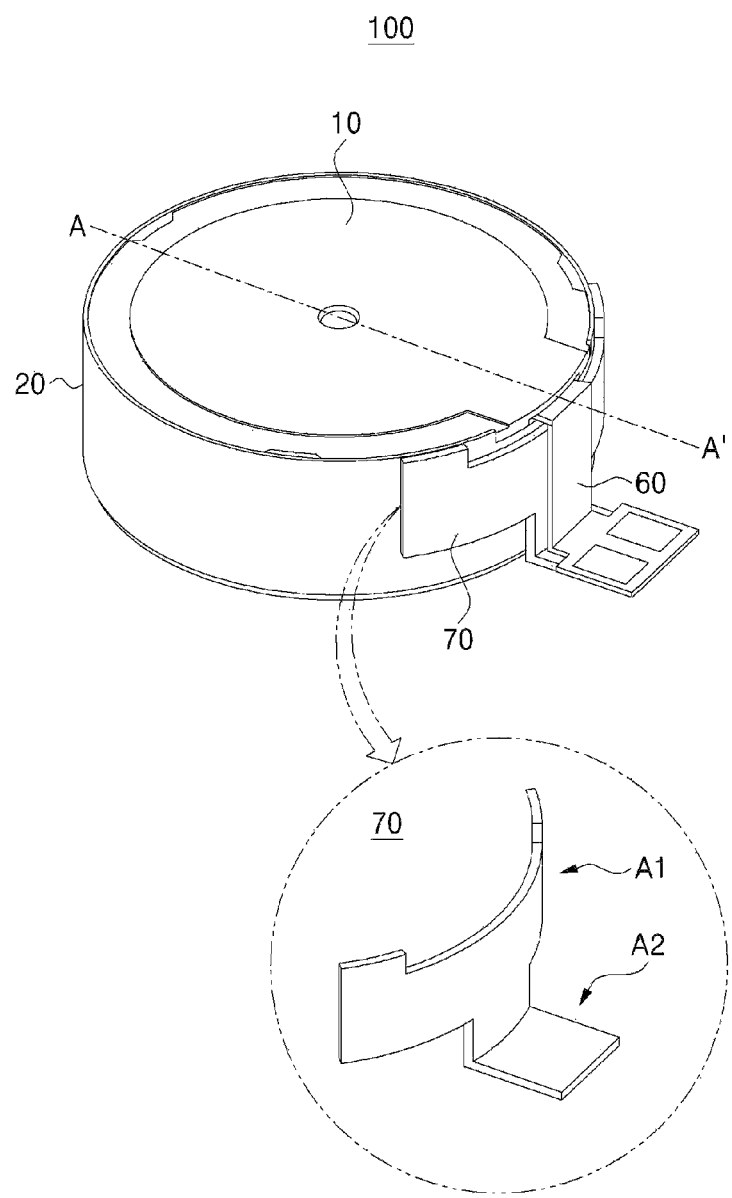
FIG. 1 is a perspective view showing a sound vibration actuator according to a first embodiment of the present invention.

Hereinafter, the present invention is in detail explained with reference to the attached drawings. In the description, it should be noted that the parts corresponding to those of the drawings are indicated by corresponding reference numerals. Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms.

All terms (including technical or scientific terms) used herein, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification. An expression referencing a singular value additionally refers to a corresponding expression of the plural number, unless explicitly limited otherwise by the context.

In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Figure 2:
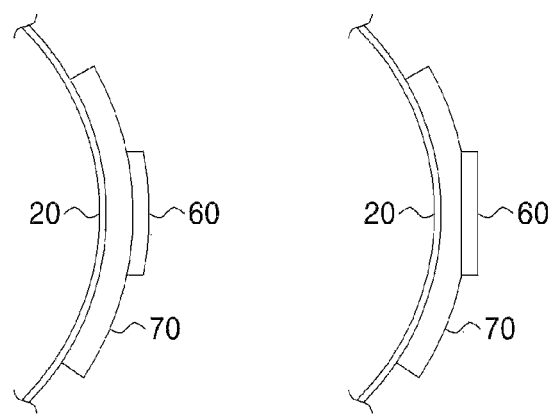
FIG. 2 is top sectional views showing examples of a portion of the sound vibration actuator according to the first embodiment of the present invention.
Figure 2:
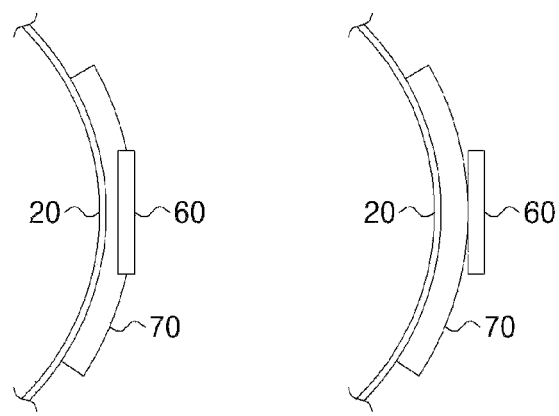

FIG. 1 is a perspective view showing a sound vibration actuator according to a first embodiment of the present invention, and FIG. 2 is top sectional views showing examples of a portion of the sound vibration actuator according to the first embodiment of the present invention.

As shown in FIG. 1, the sound vibration actuator 100 has a shape of a cylinder and is configured to have a substrate 60 exposed outward from a casing 20. In this case, the sound vibration actuator 100 is a device for generating vibrations and sounds caused from the vibrations, while receiving power for generating the vibrations from the substrate 60 exposed outward therefrom.

The substrate 60, which supplies the power to the sound vibration actuator 100, is constituted of a thin FPC (Flexible Printed Circuit), and so as to allow the sound vibration actuator 100 to be connected to an external device, accordingly, the thin FPC substrate 60 has to be stably fixed to the sound vibration actuator 100. To do this, the sound vibration actuator 100 has a substrate seating part 70 disposed on the outer peripheral surface of the casing 20 in such a manner as to allow the substrate 60 to be stably located thereon.

In more detail, the substrate seating part 70 is divided into a first area A1 disposed on the outer peripheral surface of the casing 20 and a second area A2 extended from the first area A1 in such a manner as to seat the bent substrate 60 thereon. According to the present invention, further, the first area A1 of the substrate seating part 70 has the same curvature as the outer peripheral surface of the casing 20, so that when the substrate seating part 70 is welded to the casing 20, it can be tightly contacted with the outer peripheral surface of the casing 20.

As shown in (a) of FIG. 2, accordingly, the substrate 60 has the same curvature as the substrate seating part 70, so that the casing 20, the substrate seating part 70, and the substrate 60 can be tightly contacted with one another sequentially.

As shown in (b) of FIG. 2, on the other hand, if the substrate 60 does not have any curvature, a portion of the outer peripheral surface of the substrate seating part 70 laid on the substrate 60 is flat to the same level as the substrate 60, and as shown in (c) of FIG. 2, a groove on a portion of the substrate seating part 70 is formed to seat the substrate thereon. As shown in (d) of FIG. 2, further, the substrate seating part 70 having a given curvature comes into contact with the flat substrate 60.

Referring again to FIG. 1, the second area A2 of the substrate seating part 70 is bent to the same manner as the substrate 60, and according to the present invention, a hole may be formed on the second area A2. If the hole is formed on the second area A2, power can be supplied to the substrate 60 coming into contact with the substrate seating part 70, and further, the thin substrate 60 can be stably fixed in a process where the sound vibration actuator 100 is connected to the external device.

As shown in FIG. 1, the thicknesses of the first area A1 and the second area A2 of the substrate seating part 70 are different from each other, but they are not limited thereto. In detail, they have various shapes capable of supporting the substrate 60 and being stably fixed to the outer peripheral surface of the casing 20.

Up to now, an explanation on the substrate seating part 70 of the sound vibration actuator 100 according to the first embodiment of the present invention has been given. According to the present invention, the substrate seating part 70 is located on the outer peripheral surface of the casing 20, so that the entire thickness of the sound vibration actuator 100 can be reduced, thereby manufacturing more compact sound vibration actuator 100. Now, an explanation on the sound vibration actuator 100 having the substrate seating part 70 capable of reducing the entire thickness thereof will be in detail explained.

Figure 3:
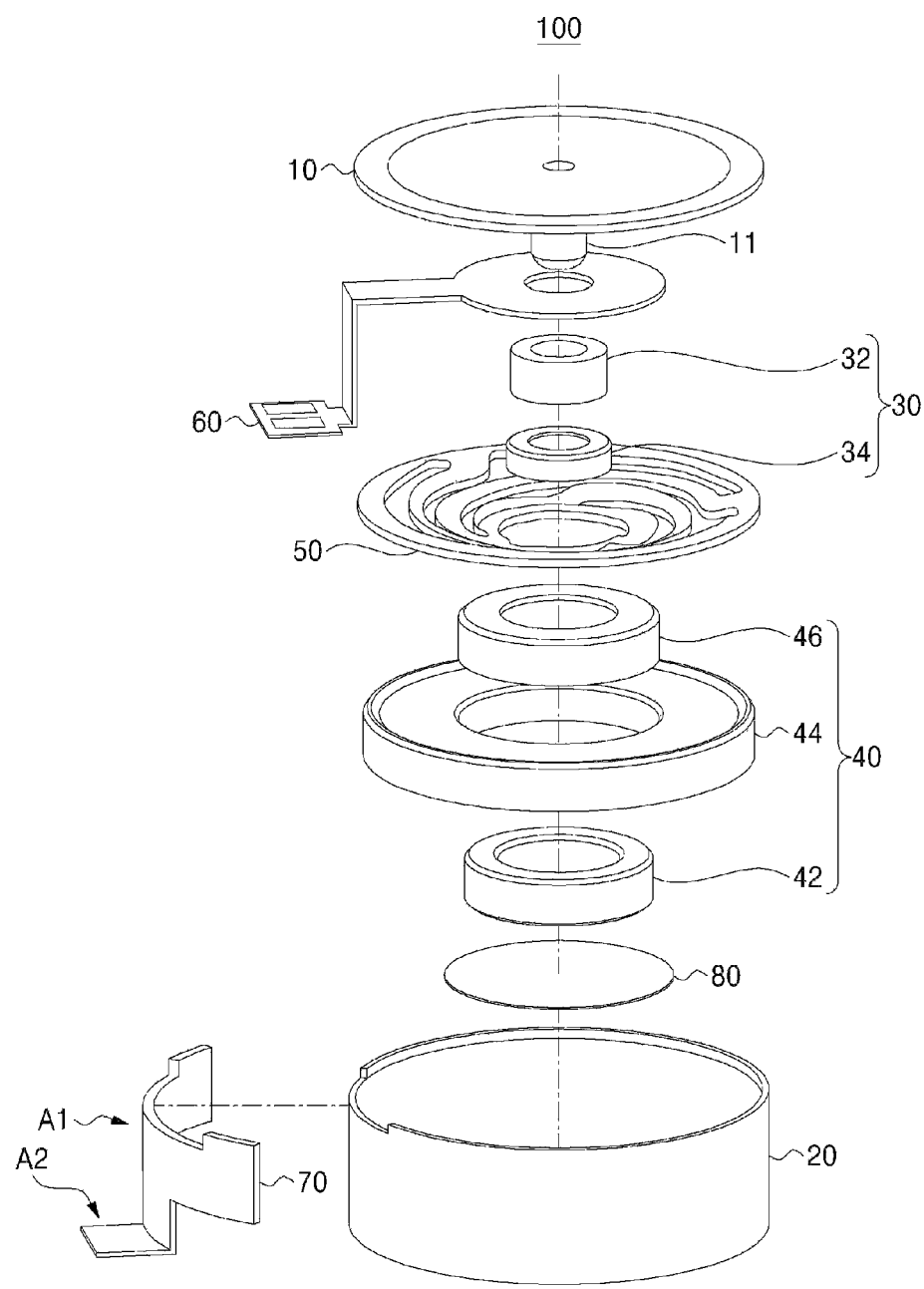
FIG. 3 is an exploded perspective view showing the sound vibration actuator according to the first embodiment of the present invention.
Figure 4:
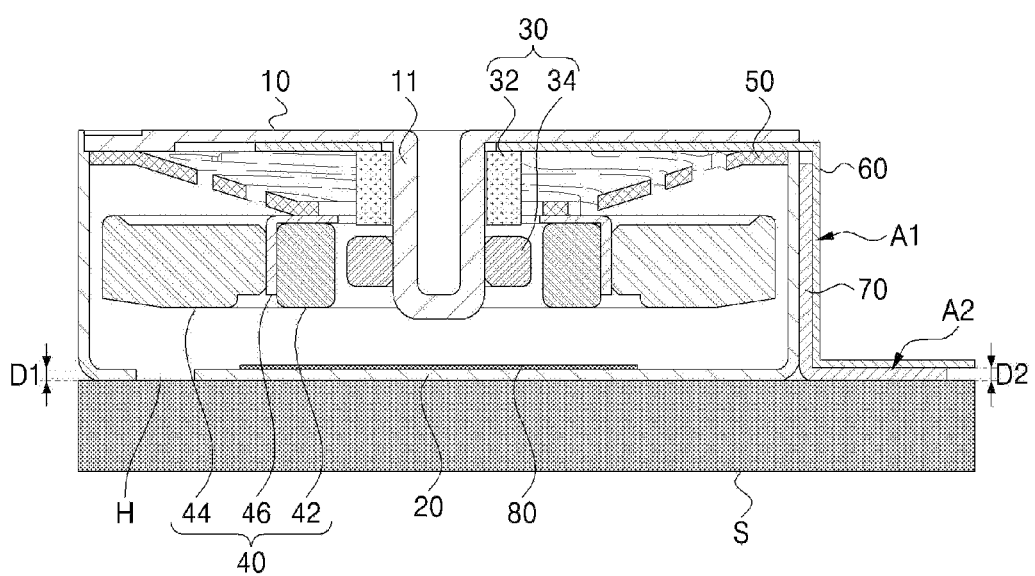
FIG. 4 is a sectional view taken along the line A-A' of the sound vibration actuator of FIG. 1.

FIG. 3 is an exploded perspective view showing the sound vibration actuator according to the first embodiment of the present invention, and FIG. 4 is a sectional view taken along the line A-A' of the sound vibration actuator of FIG. 1.

As shown in FIG. 3 and FIG. 4, the sound vibration actuator 100 according to the present invention includes a bracket 10, a casing 20, a coil part 30, a magnet part 40, an elastic member 50, a substrate 60 and a substrate seating part 70.

The sound vibration actuator 100 according to the present invention has an internal space formed by means of the bracket 10 and the casing 20, can generate vibrations by means of an electromagnetic force generated between the magnet part 40 and the coil part 30, and can generate sounds by means of such vibrations.

The bracket 10 has a protrusion 11 formed on the center thereof to seat the coil part 30 thereon. As shown in FIG. 7, the protrusion 11 is insertedly formed inwardly from the center of the bracket 10 by means of press or deep drawing process, but of course, a separate component like a center yoke may be insertedly fitted to the center of the bracket 10 to support the components like the coil part 30 disposed inside the sound vibration actuator 100.

The bracket 10 may be an acoustic diaphragm which is vibrated by means of the electromagnetic force generated between the magnet part 40 and the coil part 30 to thus generate sounds.

The casing 20 has an internal space in which the coil part 30, the magnet part 40 and the elastic member 100 for linear motions are housed, and the bracket 10 is welded to top or underside of the casing 20 to seal the space formed by the casing 20. To do this, the casing 20 is open on any one of top and underside thereof.

Desirably, the casing 20 whose top is open and the bracket 10 are welded to each other to form an internal space of the sound vibration actuator 100, and the bracket 10 is located on top of the casing 20.

Further, the casing 20 includes an adhesive member or fixing hole H on the underside thereof so that it can be connected to the external device S. In more detail, the external device S includes various kinds of devices for generating sounds, such as a display module, and so on.

The underside of the casing 20 is fixed to the external device S, like this, and if power is supplied to the sound vibration actuator 100, the coil part 30 disposed on top of the casing 20, that is, on one surface of the bracket 10 not fixed is also vibrated, so that the sound vibration actuator 100 may generate vibrations in a high frequency band. According to the present invention, if the coil part 30 is vibrated together with the sound vibration actuator 100, the sound vibration actuator 100 can generate vibrations in the range of 5500 to 7000 Hz, thereby performing various haptic functions.

The sound vibration actuator 100 generates the vibrations in the high frequency band, and if the sound vibration actuator 100 is built in a mobile terminal, furthermore, sounds are generated from a display surface of the mobile terminal, thereby enabling more efficient use of the display of the mobile terminal. In addition, as mentioned above, the substrate seating part 70 is disposed on the outer peripheral surface of the casing 20, so that the entire thickness of the sound vibration actuator 100 can be reduced, which allows the sound vibration actuator 100 to be built even in a relatively thin mobile terminal.

The casing 20 has a cylindrical shape, but it may have a shape of a square casing or polygonal casing, while being not necessarily limited thereto. Also, the bracket 10 welded to the casing 20 and the elastic member 10 housed in the casing 20 have the same square or polygonal shape as the casing 20.

The coil part 30 includes a coil 32 and a coil yoke 34. According to the present invention, the coil 32 and the coil yoke 34 are fittedly disposed to the outer peripheral surface of the protrusion 11, and the coil 32 comes into contact with the substrate 60 as will be discussed later.

The coil 32 and the coil yoke 34 may be a ring shape, but not necessarily limited thereto. Actually they can have any shape if they have a hole in the center into the protrusion be inserted.

The coil 32 may be a sound coil that generates magnetic fields having different directions and strengths. In more detail, if an alternating current is applied to the coil 32 through the substrate 60, an alternating magnetic field is generated from the coil 32, so that the bracket 10 coming into contact with the coil 32 is vibrated to a signal in an audible frequency range, thereby generating sounds.

Further, an alternating magnetic field induced in the coil 32 can make the magnet part 40 vibrate. In the present invention, a resonant frequency of the magnet part 40 ranges from 100 hz to 250 Hz and an alternating current corresponding to the resonant frequency can be supplied to the coil 32, but the resonant frequency can be changed according to design conditions.

The coil yoke 34 is fittedly disposed on the outer peripheral surface of the protrusion 11 in parallel with the coil 32 and serves to amplify the electromagnetic force generated from the coil 32.

The magnet part 40 is located around the coil 32 and includes a magnet 42, a weight 44, and a yoke 46. If the alternating current is applied to the coil part 30 through the substrate 60, an alternating magnetic field is generated from the coil 32, and accordingly, the magnet 42 is cooperatively operated with the alternating magnetic field, so that the magnet 42 is vibrated up and down. The magnet 42 can be driven with different vibration forces according to variations of the alternating current.

Though the magnet 42 is one in FIG. 3 and FIG. 4, it may include two or more magnets coupled to each other. If the two or more magnets are coupled to each other, the electromagnetic force can be stronger than that generated from one magnet.

Meanwhile, a magnetic fluid (not shown) can be applied to one of the side surfaces of the magnet 42 or the coil yoke 34 to prevent direct contact between them, thereby suppressing the noise or damage caused by direct collision between them. Further, because of its viscosity, the magnetic fluid can help the magnet 42 stop vibration more quickly after turning off the power.

The weight 44 of the magnet part 40 is disposed around the magnet 42 and serves to amplify the up and down vibrations of the magnet 42 by means of its self weight. Further, an outer diameter of the weight 44 is smaller than an inner diameter of the casing 20, so that in a process where the entire magnet part 40 is vibrated up and down, the contact of the magnet part 40 with the casing 20 is prevented to ensure the reliability of the sound vibration actuator 100.

The yoke 46 of the magnet part 40 is disposed between the magnet 42 and the weight 44, and serves to form a closed magnetic circuit capable of allowing the magnetic field generated from the magnet 42 to gently flow.

The elastic member 50 is disposed on the bracket 10 to support the magnet part 40. The elastic member 50 is decreased in diameter as it goes from the outer peripheral to the inner center and protruded downward direction. The inner (lowest) surface part of the elastic member 50 is fixed to the magnet part 40, and the outer (toppest) surface thereof is coupled to the bracket 10.

The elastic member 50 serves to support the up and down motions of the magnet part 40 and to amplify the up and down vibrations of the magnet part 40 by means of the given elasticity thereof. The elastic member 50 can be made of some magnetic materials.

On the other hand, one surface of the elastic member 50 does not come into contact with the bracket 10 but comes into contact with the casing 20, and a detailed explanation on such case will be given later.

The substrate 60 is the thin FPC substrate which is fixed to the bracket 10, and further, a portion of the substrate 60 is exposed outward from the internal space formed by the bracket 10 and the casing 20 to receive a power signal from the outside. In more detail, the substrate 60 has a hole formed on the center thereof in such a manner as to have the same diameter as the protrusion 11 of the bracket 10 so that it can be fixed to the bracket 10, and further, the substrate 60 comes into direct contact with the coil 32. Moreover, the portion of the substrate 60, which is exposed outward from the internal space formed by the bracket 10 and the casing 20 to receive the power signal from the outside, is extended downward along the outer peripheral surface of the casing 20, and next, the end portion of the substrate 60 is bent on the bottom periphery of the casing 20 in such a manner as to be parallel with the casing 20.

Further, the substrate 60 includes an input terminal formed on an area where the end portion thereof is bent so that the power received from the outside is supplied to the coil part 30 from the substrate 60.

The substrate seating part 70 is disposed on the outer peripheral surface of the casing 20 in such a manner as to allow the substrate 60 exposed outward from the casing 20 to be stably fixed thereto. In more detail, the substrate seating part 70 is divided into a first area A1 disposed on the outer peripheral surface of the casing 20 and a second area A2 extended from the first area A1 in such a manner as to seat the substrate 60 whose end portion is bent thereon.

Further, the underside of the second area A2 of the substrate seating part 70 is located on the same plane as the underside not open of the casing 20, so that one surface of the sound vibration actuator 100 can be attached to the external device, without having any loosening, thereby ensuring high reliability in the sound vibration actuator 100.

According to the present invention, the substrate seating part 70 is disposed on the same plane as the casing 20, and further, a thickness D2 of the second area A2 of the substrate seating part 70 is the same as a thickness D1 of the underside of the casing 20, so that the loss in the amount of vibration of the sound vibration actuator 100 can be prevented and the power received from the outside to the substrate seating part 70 can be supplied to the substrate 60, without any loss.

A buffering member 80 is disposed on the bottom of the internal space of the sound vibration actuator 100 to absorb the impacts directly applied to the casing 20 according to the up and down movements of the magnet part 40 and to suppress the occurrence of noise caused by the vibrations. For example, the buffering member 80 has a shape of a circle like the underside of the casing 20, and otherwise, it may have a shape of a ring like the ring-shaped magnet part 40.

Up to now, an explanation on the sound vibration actuator 100 according to the first embodiment of the present invention has been given, and now, an explanation on the sound vibration actuator 100 wherein the casing 20 does not have any cylindrical shape but has a polygonal shape will be in detail explained.

Figure 5:
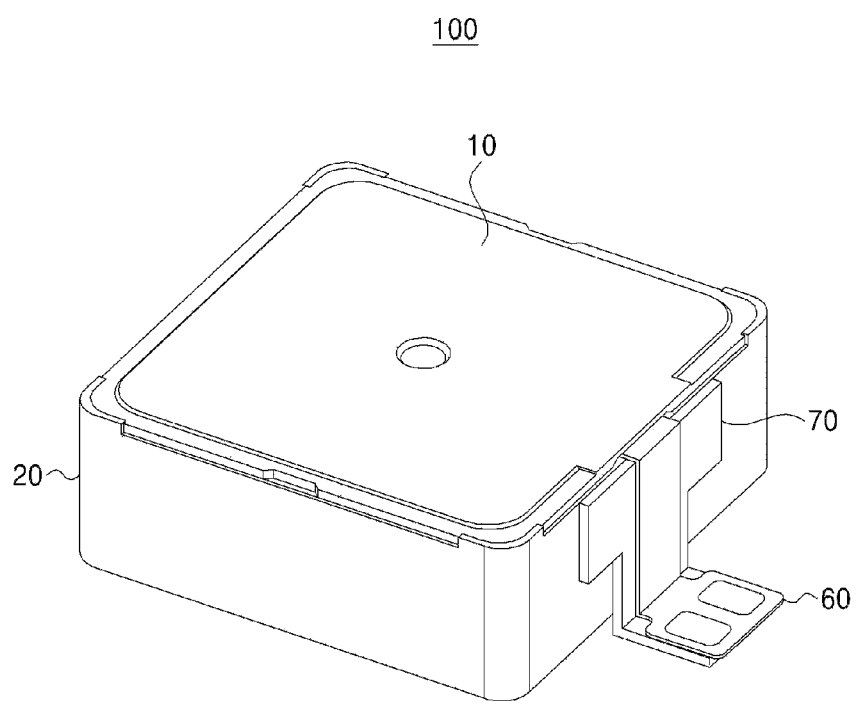
FIG. 5 is a perspective view showing a sound vibration actuator according to a second embodiment of the present invention.

FIG. 5 is a perspective view showing a sound vibration actuator according to a second embodiment of the present invention.

As shown in FIG. 5, the sound vibration actuator 100 has a shape of a generally square casing, and a substrate 60 is exposed outward from a casing 20. As mentioned in FIG. 1, the substrate 60 is a thin FPC substrate, and so as to allow the substrate 60 to be stably fixed to the casing 20, accordingly, a substrate seating part 70 is disposed on one surface of the casing 20 from which the substrate 60 is exposed.

In more detail, the substrate seating part 70 is divided into a first area A1 disposed on the outer peripheral surface of the casing 20 and a second area A2 extended from the first area A1 in such a manner as to seat the substrate 60 whose end portion is bent thereon. According to the present invention, further, a length of the first area A1 of the substrate seating part 70 is the same as a length of one side surface of the casing 20, so that the substrate seating part 70 can be rigidly coupled to the casing 20.

In case of the sound vibration actuator 100 having the shape of the generally square casing, the casing 20 and a magnet part 40 and an elastic member 50 disposed in the casing 20 have shapes of squares, so that a vibration force of the sound vibration actuator 100 can be enhanced, and also, the design of a coil part 30 and the magnet part 40 is changed to improve the haptic and sound functions of the sound vibration actuator 100.

Up to now, an explanation on the sound vibration actuator 100 according to the second embodiment of the present invention has been given, and now, an explanation on a sound vibration actuator 100 according to a third embodiment of the present invention, wherein an elastic member 50 is differently disposed from that in the first embodiment of the present invention, will be in detail explained.

Figure 6:
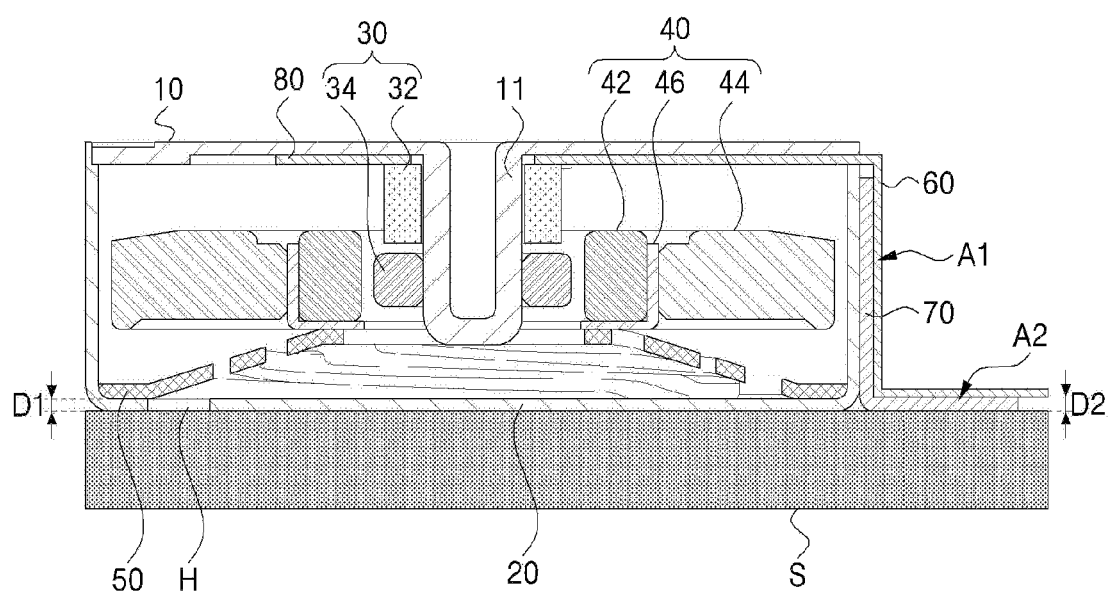
FIG. 6 is a sectional view showing a sound vibration actuator according to a third embodiment of the present invention.

FIG. 6 is a sectional view showing a sound vibration actuator 100 according to a third embodiment of the present invention.

As shown in FIG. 6, only the parts of the sound vibration actuator 100 according to the third embodiment of the present invention, which are different from those of the sound vibration actuator 100 in the first embodiment of the present invention, will be explained.

As shown in FIG. 6, the elastic member 50 is decreased in diameter as it goes from the bottom to the top thereof and serves to support the magnet part 40 in the internal space formed by the casing 20. The top (inner) surface part of the elastic member 50 is fixed to the magnet part 40, and the other (outer) surface thereof is coupled to the casing 20 forming a bottom side.

The elastic member 50 serves to support the up and down motions of the magnet part 40 and to amplify the up and down vibrations of the magnet part 40 by means of the given elasticity thereof. The elastic member 50 can be made of some magnetic materials.

If the elastic member 50 comes into contact with the underside of the casing 20, further, they can be rigidly coupled to each other by means of welding, and through the adjustment in position of the welded points, they can be coupled to each other, without any loosening.

Up to now, an explanation on the sound vibration actuator 100 according to the first to third embodiments of the present invention has been given, and the sound vibration actuator 100 according to the present invention can generate vibrations and sounds in various frequency bands from a low frequency band to a high frequency band by means of the electromagnetic force generated between the coil part 30 and the magnet part 40, so that if the sound vibration actuator 100 is built in the mobile terminal, a manufacturing cost can be saved, and as the substrate seating part 70 is disposed on the outer periphery of the casing 20, the entire thickness of the sound vibration actuator 100 can be reduced, which allows the sound vibration actuator 100 to be applied to a relatively thin electronic device.

As described above, the sound vibration actuator, which converts electrical vibrations into acoustic vibrations to generate sounds, can stably fix the input terminal exposed outward therefrom, thereby ensuring high reliability thereof.

In addition, the sound vibration actuator according to the present invention can reduce the entire thickness thereof, while constantly maintaining an amount of vibration.

Further, the sound vibration actuator according to the present invention can generate vibrations in various frequency bands because the coil and the magnet are not fixed in the process where the vibrations are generated.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:
1. A sound vibration actuator comprising:
   a bracket (10) and a casing (20) for forming an internal space;
   a coil part (30) coupled to the bracket (10) in the internal space;
   a magnet part (40) disposed around the coil part (30);
   an elastic member (50) whose one surface coupled to the magnet part (40);
   a substrate (60) fixed to the bracket (10) and exposed outward from the internal space; and
   a substrate seating part (70) disposed on an outer side surface of the casing (20),
   wherein the substrate (60) is disposed on a top surface of the substrate seating part (70).

2. The sound vibration actuator according to claim 1, wherein the substrate seating part (70) comprises:
   a first area (A1) disposed on the outer side surface of the casing (20); and
   a second area (A2) deflected and extended outward from the first area (A1) in such a manner as to seat the substrate (60) thereon.

3. The sound vibration actuator according to claim 2, wherein an underside of the second area (A2) of the substrate seating part (70) is located on the same plane as an underside of the casing (20) opposite an open side of the casing (20).

4. The sound vibration actuator according to claim 2, wherein the first area (A1) of the substrate seating part (70) comes into contact with the outer side surface of the casing (20).

5. The sound vibration actuator according to claim 1, wherein the other surface of the elastic member, which is opposite the surface coupled to the magnet part (40), is fixed to the casing (20) or the bracket (10).

6. The sound vibration actuator according to claim 1, wherein the substrate seating part (70) comes into close contact with the outer side surface of the casing (20) by means of welding.

* * * * *